United States Patent
Ogawa et al.

(10) Patent No.: US 7,999,429 B2
(45) Date of Patent: Aug. 16, 2011

(54) POWER TRANSMISSION APPARATUS (75) Inventors: Hiroyuki Ogawa, Susono (JP); Akira Murakami, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 74 days.

(21) Appl. No.: 12/598,152

(22) PCT Filed: May 8, 2008

(86) PCT No.: PCT/JP2008/058532
§ 371 (c)(1),
(2), (4) Date: Dec. 31, 2009

(87) PCT Pub. No.: WO2008/140010
PCT Pub. Date: Nov. 20, 2008

(65) Prior Publication Data
US 2010/0108453 A1    May 6, 2010

(30) Foreign Application Priority Data
May 9, 2007    (JP) .................................. 2007-124805

(51) Int. Cl.
H02K 49/00 (2006.01)
H02K 49/02 (2006.01)
F16D 27/00 (2006.01)
F04B 49/00 (2006.01)
F04B 17/00 (2006.01)

(52) U.S. Cl. ............ 310/103; 310/92; 310/93; 310/104; 310/105; 192/21.5; 417/310; 417/410.1; 417/410.4; 417/420

(58) Field of Classification Search .................... 310/76, 310/78, 92, 93, 95, 96, 99, 100, 103–106; 192/21.5; 417/310, 401.1, 410.4, 420
See application file for complete search history.

(56) References Cited

U.S. PATENT DOCUMENTS

| 2,870,642 A | 1/1959 | Randol |
| 2008/0181804 A1* | 7/2008 | Tanigawa et al. .......... 418/206.1 |

FOREIGN PATENT DOCUMENTS

| DE | 198 15 881 A1 | 10/1999 |
| GB | 767000 | 1/1957 |
| JP | 62 251529 | 11/1987 |
| JP | 62251529 A * | 11/1987 |
| JP | 1 93629 | 4/1989 |
| JP | 01093629 A * | 4/1989 |
| JP | 2 134417 | 5/1990 |
| JP | 3 260438 | 11/1991 |
| JP | 5 106654 | 4/1993 |
| JP | 05106654 A * | 4/1993 |

* cited by examiner

Primary Examiner — Quyen Leung
Assistant Examiner — Jose A Gonzalez Quinones
(74) Attorney, Agent, or Firm — Oblon, Spivak, McClelland, Maier & Neustadt, L.L.P.

(57) ABSTRACT

A power transmission apparatus includes a drive roller and a driven roller made of magnetic material, which are rotatable about different axes, and which are provided with a gap therebetween, a case enclosing the rollers, an input shaft and an output shaft connected coaxially with the rollers through the case, respectively, and a magnetic fluid housed in the case to fill the gap. The apparatus includes an electromagnetic coil for generating magnetism, and a magnetic path of the magnetism generated by the electromagnetic coil is formed so that a magnetic field is generated from the drive roller or the driven roller toward the driven roller or the drive roller via the gap.

6 Claims, 10 Drawing Sheets

POSITION OF MAGNETIC FIELD

POWER TRANSMISSION APPARATUS

TECHNICAL FIELD

The present invention relates to a power transmission apparatus utilizing a magnetic fluid.

BACKGROUND ART

There is a known power transmission apparatus in which a magnetic fluid is interposed between a pair of disks disposed coaxially and torque transmitted between the disks is controlled by changing a magnetic field acting on the magnetic fluid (see Patent Document 1, for example).

Patent Document 1: Japanese Patent Application Laid-Open No. 5-106654

DISCLOSURE OF THE INVENTION

Problems to be Solved by the Invention

Because the pair of disks is disposed coaxially, the prior-art power transmission apparatus can be used only as a clutch for switching between transmission and non-transmission of power and has a low degree of freedom in setting regarding power transmission. For example, in the prior-art power transmission apparatus, a rotation speed cannot be changed between the disks and a torque ratio between the disks cannot be changed either unless strength of a magnetic field is changed to cause slippage.

Therefore, it is an object of the present invention to provide a power transmission apparatus capable of transmitting power between a pair of rotating bodies by utilizing a magnetic fluid and having a high degree of freedom in setting regarding power transmission.

Means to Solve the Problems

A power transmission apparatus according to the present invention includes: a pair of rotating bodies made of magnetic material, rotatable about different axes, and provided with a gap therebetween; a case enclosing the pair of rotating bodies; a pair of power transmission shafts connected coaxially with the pair of rotating bodies, respectively, through the case; a magnetic fluid housed in the case to fill the gap; a magnetism generating device for generating magnetism; and a magnetic path forming device for forming a magnetic path of the magnetism generated by the magnetism generating device so that a magnetic field from one of the rotating bodies toward the other of the rotating bodies via the gap is generated.

According to the power transmission apparatus of the invention, by generating the magnetic field between the pair of rotating bodies, shear stress of the magnetic fluid increases in the gap between the rotating bodies, and power transmission through the magnetic fluid between the rotating bodies becomes possible. Because the axes of the rotating bodies are different from each other, it is possible to set a transmission gear ratio between the rotating bodies at a value according to a ratio between distances from each of the axes of the rotating bodies to a position of power transmission by the magnetic fluid. A torque ratio between the rotating bodies can be set at a value according to a transmission gear ratio between them as well. If the magnetic field disappears, the shear stress of the magnetic fluid becomes substantially zero and power transmission can be stopped between the rotating bodies. Therefore, the power transmission apparatus can serve not only as an apparatus for switching between transmission and non-transmission of power between the pair of power transmission shafts but also as an apparatus for transmitting power while changing the rotation speed and a torque ratio between the power transmission shafts. As a result, it is possible to increase a degree of freedom in setting regarding power transmission.

According to an embodiment of the power transmission apparatus of the invention, the axes of the pair of rotating bodies may be parallel to each other and the gap may be provided between outer peripheral faces of the pair of rotating bodies. According to the embodiment, the magnetic field acts in a radial direction between the outer peripheral faces of the pair of rotating bodies, the shear stress of the magnetic fluid increases due to the magnetic field, and power is transmitted. In this case, by adjusting a ratio of radiuses of rotation of the rotating bodies about their axes, it is possible to set a transmission gear ratio between the rotating bodies at a suitable value.

In the above embodiment, a plurality of transmitting portions may be provided between the pair of power transmission shafts, the pair of rotating bodies may be disposed in each of the plurality of transmitting portions, a ratio of radiuses of rotation of the pair of rotating bodies may be different between the transmitting portions, and the magnetic path forming device may have a magnetic path switching device for selecting any one transmitting portion from the plurality of transmitting portions to form the magnetic path between the pair of rotating bodies in the transmitting portion and the magnetism generating device and for disconnecting the rotating bodies in the other transmitting portions which were not selected and the magnetism generating device from each other so that the magnetic path is not formed.

According to this embodiment, because the ratio of radiuses of rotation of the pair of rotating bodies is different between the transmitting portions, the transmission gear ratio and the torque ratio between the rotating bodies is different between the transmitting portions. Therefore, by switching the transmitting portion to be selected by the magnetic path switching device, it is possible to switch the transmission gear ratio between the pair of power transmission shafts between a plurality of stages equal to the number of transmitting portions.

According to an embodiment of the power transmission apparatus of the invention, the axes of the pair of rotating bodies may be parallel to each other and the pair of rotating bodies may be provided with the gap therebetween to face each other in an axial direction. According to the embodiment, the magnetic field acts so as to axially traverse the gap between the pair of rotating bodies, the shear stress of the magnetic fluid increases due to the magnetic field, and power is transmitted. In this case, by adjusting a ratio of distances from the axes of the rotating bodies to a center of the magnetic field, it is possible to set a transmission gear ratio between the rotating bodies at a suitable value.

In the above embodiment, the magnetic path forming device may be provided with a pair of magnetic poles arranged in the axial direction to sandwich the pair of rotating bodies and the power transmission apparatus may further include a position changing device for changing positions of the pair of magnetic poles in radial directions of the rotating bodies. According to this embodiment, by radially changing the positions of the magnetic poles by the position changing device, the ratio between the distances from the axes of the pair of rotating bodies to the center of the magnetic field changes. As a result, it is possible to change the transmission gear ratio between the pair of rotating bodies according to the positions of the magnetic poles.

The power transmission apparatus of the invention may further include a magnetic field adjusting device for changing strength of the magnetic field. By changing the strength of the magnetic field, it is possible to increase or decrease the shear stress of the magnetic fluid to change the torque ratio between the rotating bodies. As a result, it is possible to further flexibly change the torque ratio determined according to setting of the transmission gear ratio and a degree of freedom in setting regarding the power transmission is further increased.

In the power transmission apparatus of the invention, a surface of at least one of the rotating bodies facing the gap may be provided with unevenness along a circumferential direction thereof. By providing the unevenness, it is possible to enhance torque transmission efficiency between the magnetic fluid the shear stress of which has been increased due to the magnetic field and the rotating bodies.

BEST MODE FOR CARRYING OUT THE INVENTION

First Embodiment

Figure 1:
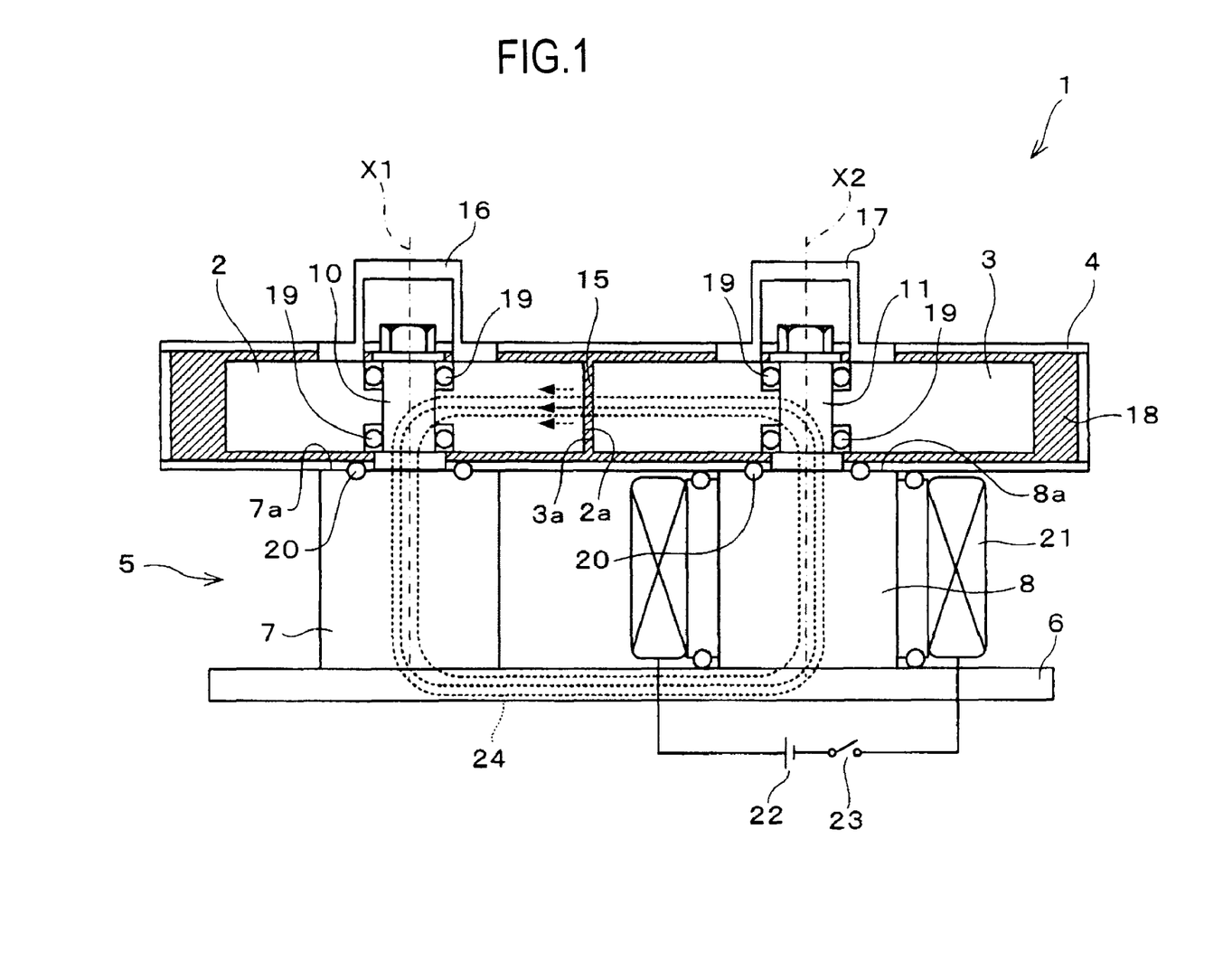
FIG. 1 is a sectional view taken along an axial direction of a power transmission apparatus according to a first embodiment of the present invention.

FIG. 1 is a sectional view of a power transmission apparatus according to a first embodiment of the present invention. The power transmission apparatus 1 includes a drive roller 2 and a driven roller 3 as rotating bodies, a case 4 enclosing the rollers 2 and 3, and a support mechanism 5 for supporting the rollers 2 and 3 and the case 4. Both of the rollers 2 and 3 are in disk shapes and equal to each other in diameter and thickness. The support mechanism 5 includes a base 6 and a pair of support legs 7 and 8 fixed onto the base 6. The case 4 is fixed onto upper faces 7a and 8a of the support legs 7 and 8. Support shafts 10 and 11 are provided on the upper faces 7a and 8a of the support legs 7 and 8 and these support shafts 10 and 11 are inserted into the case 4. An axis X1 of the support shaft 10 and an axis X2 of the support shaft 11 are parallel to each other. The drive roller 2 is coaxially and rotatably fitted over the support shaft 10 and the driven roller 3 is coaxially and rotatably fitted over the support shaft 11. In this way, the rollers 2 and 3 are rotatably supported about the axes X1 and X2 which are parallel to each other. The rollers 2 and 3 are prevented from slipping off the support shafts 10 and 11 by bolts 12 and nuts 13.

Figure 2:
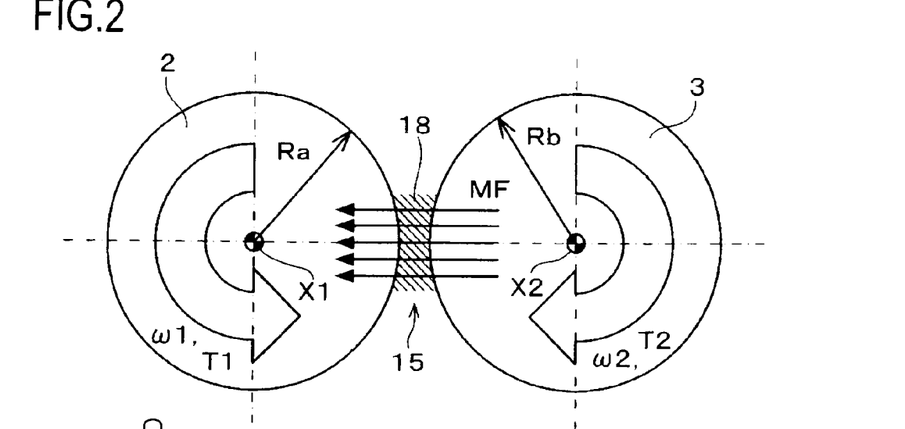
FIG. 2 is a plan view showing a relationship between rollers of the power transmission apparatus according to the first embodiment.

The rollers 2 and 3 supported on the support shafts 10 and 11 are in the same positions in an axial direction (the direction of the axes X1 and X2). As also shown in FIG. 2, a gap 15 in a radial direction is provided between outer peripheral faces 2a and 3a of the rollers 2 and 3. Size of the gap 15 is in such a range that a magnetic path can be formed between the rollers 2 and 3. An input shaft 16 is mounted on an upper portion of the drive roller 2 to be rotatable with the roller 2 and an output shaft 17 is mounted on an upper portion of the driven roller 3 to be rotatable with the roller 3. These shafts 16 and 17 protrude upward of the case 4 and serve as power transmission shafts. The input shaft 16 is connected to a power generating side and the output shaft 17 is connected to a side driven by the power. For example, to mount the power transmission apparatus 1 between a prime mover (an internal combustion engine, an electric motor, or the like) and drive wheels of a vehicle, an output shaft side of the prime mover and the input shaft 16 are connected and a drive wheel side of the vehicle and the output shaft 17 are connected.

In the case 4, a magnetic fluid 18 is housed to fill the gap 15. Seal rings 19 are attached to upper and lower end portions of inner peripheries of the rollers 2 and 3 so as to prevent entry of the magnetic fluid 18 between the rollers 2 and 3 and support shafts 10 and 11. Similarly, seal rings 20 are attached between the support legs 7 and 8 and the case 4 to surround the support shafts 10 and 11 so as to prevent leakage of the magnetic fluid 18 from gaps between the case 4 and the support shafts 10 and 11.

An electromagnetic coil 21 as a magnetism generating device is provided around an outer periphery of the support leg 8 on the driven roller 3 side. The electromagnetic coil 21 is connected to a DC power supply 22 via a switch 23. All the base 6, the support legs 7 and 8, the support shafts 10 and 11, and the rollers 2 and 3 are made of magnetic material. As magnetic material, it is preferable to use soft magnetic material with a low coercive force and high magnetic permeability. For example, the rollers 2 and 3 and the like can be made of iron or iron-based alloy. In order to prevent an unintended change in a magnetic path 24, the case 4, the input shaft 16, and the output shaft 17 are made of nonmagnetic material.

In the power transmission apparatus 1 formed as described above, if the switch 23 is closed to excite the electromagnetic coil 21, as shown in broken lines in FIG. 1, the magnetic path 24 is formed to pass through the support leg 8, the support shaft 11, the driven roller 3, the gap 15, the drive roller 2, the support shaft 10, the support leg 7, and the base 6 in order and then return to the support leg 8. As a result, as shown with arrows MF in FIG. 2, a radial magnetic field from the driven roller 3 toward the drive roller 2 through the gap 15 is generated between the rollers 2 and 3. Because of an influence of the magnetic field, shear stress of the magnetic fluid 18 increases. As a result, power transmission between the drive roller 2 and the driven roller 3 becomes possible. Therefore, as shown in FIG. 2, if rotation at an angular velocity of ω1 and of torque T1 is given from the input shaft 16 to the drive roller 2, the driven roller 3 rotates at an angular velocity of ω2 and with torque T2 in a reverse direction to the drive roller 2. The rotation of the driven roller 3 can be taken out of the output shaft 17.

On the other hand, if the switch 23 is opened and excitation of the electromagnetic coil 21 is cancelled, the magnetic field between the rollers 2 and 3 disappears and the power transmission from the drive roller 2 to the driven roller 3 becomes impossible. Therefore, even if torque is input to the drive roller 2, the torque is not transmitted to the driven roller 3 and the driven roller 3 does not rotate. At this time, frictional resistance between the rollers 2 and 3 is vanishingly small and substantially zero. Therefore, an energy loss when the power is not transmitted is extremely small.

In the power transmission apparatus 1 according to the embodiment, a radius Ra of rotation of the drive roller 2 and a radius Rb of rotation of the driven roller 3 are equal and therefore the angular velocity ω1 of the drive roller 2 and the angular velocity ω2 of the driven roller 3 are equal to each other. However, by changing a ratio between the radiuses Ra and Rb of their rotation, it is possible to set a transmission gear ratio ω1/ω2 between the rollers 2 and 3 at an appropriate value. In this way, it is possible to accelerate or decelerate the rotation of the drive roller 2 to transmit it to the driven roller 3. For example, if the radius Ra of rotation of the drive roller 2 is set at a value greater than the radius Rb of rotation of the driven roller 3, the driven roller 3 is accelerated with respect to the drive roller 2. If the radius Ra of rotation of the drive roller 2 is set at a value smaller than the radius Rb of rotation of the driven roller 3, the driven roller 3 is decelerated with respect to the drive roller 2. If a slip loss between the rollers 2 and 3 is vanishingly small, a torque ratio between the rollers 2 and 3 changes according to an inverse of the transmission gear ratio. For example, if the driven roller 3 is accelerated with respect to the drive roller 2, the torque T2 taken out of the driven roller 3 is greater than the torque T1 input to the drive roller 2. On the other hand, if the driven roller 3 is decelerated with respect to the drive roller 2, the torque T2 taken out of the driven roller 3 is smaller than the torque T1 input to the drive roller 2. Therefore, in the power transmission apparatus 1 according to the embodiment, it is possible to set the transmission gear ratio and the torque ratio between the rollers 2 and 3 at arbitrary values by appropriately setting the radiuses Ra and Rb of rotation of the rollers 2 and 3.

Figure 3:
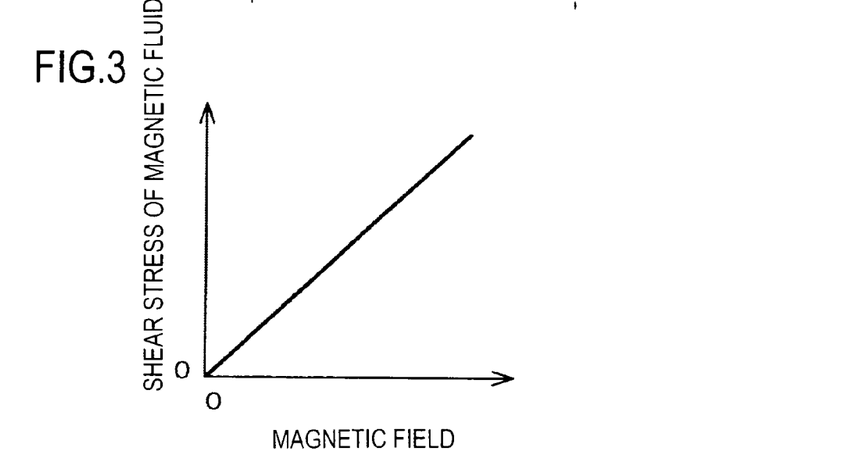
FIG. 3 is a graph showing a relationship between a magnetic field and shear stress of a magnetic fluid.
Figure 4:
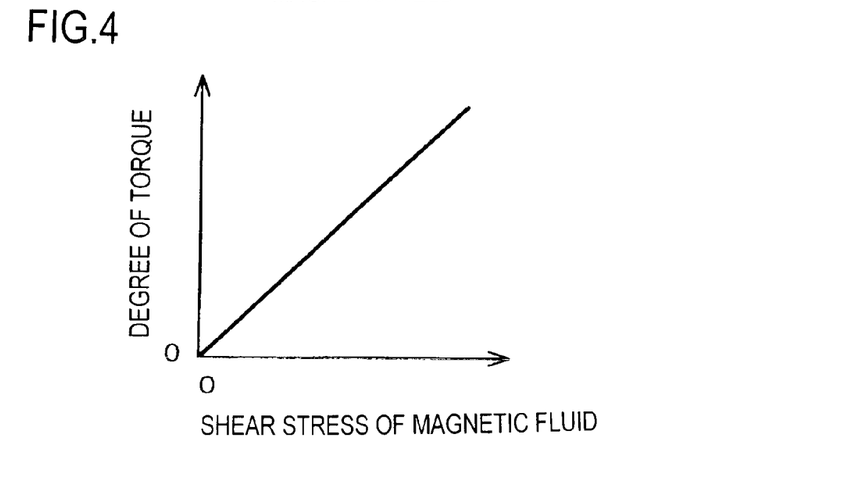
FIG. 4 is a graph showing a relationship between the shear stress of the magnetic fluid and torque transmitted between rotating bodies.

Moreover, with the power transmission apparatus 1 of the embodiment, by changing the strength of the magnetic field traversing the gap 15, the torque ratio between the rollers 2 and 3 can be further changed from the torque ratio determined according to the ratio between the radiuses Ra and Rb of rotation of the rollers 2 and 3. As shown in FIG. 3, there is such a relationship between the strength of the magnetic field acting on the magnetic fluid 18 and the shear stress of the magnetic fluid 18 that the shear stress increases as the magnetic field becomes stronger. On the other hand, as shown in FIG. 4, there is such a relationship between the shear stress of the magnetic fluid 18 and a degree of torque transmitted from the drive roller 2 to the driven roller 3 that the torque increases as the shear stress becomes greater. Therefore, the degree of torque transmitted between the rollers 2 and 3 is determined by the strength of the magnetic field acting on the gap 15 between the rollers 2 and 3. The stronger the magnetic field, the higher degree of torque can be transmitted from the drive roller 2 to the driven roller 3. The strength of the magnetic field can be changed by changing voltage of the power supply 22, by disposing a variable resistance in an electric circuit and operating it, or by applying pulse width modulation control to power-supply voltage or excitation current.

In the above power transmission apparatus 1, a combination of the rollers 2 and 3, the base 6, the support legs 7 and 8, and the support shafts 10 and 11 serves as a magnetic path forming device. However, the structure of the magnetic path forming device can be changed suitably if the magnetic field radially traversing the gap 15 can be generated between the rollers 2 and 3 while using the rollers 2 and 3 as part of the magnetic path forming device. Because the rollers 2 and 3 are made of magnetic material and used as part of the magnetic path, it is possible to efficiently focus a magnetic flux on the gap 15 to thereby enhance power transmission efficiency.

Second Embodiment

Figure 5:
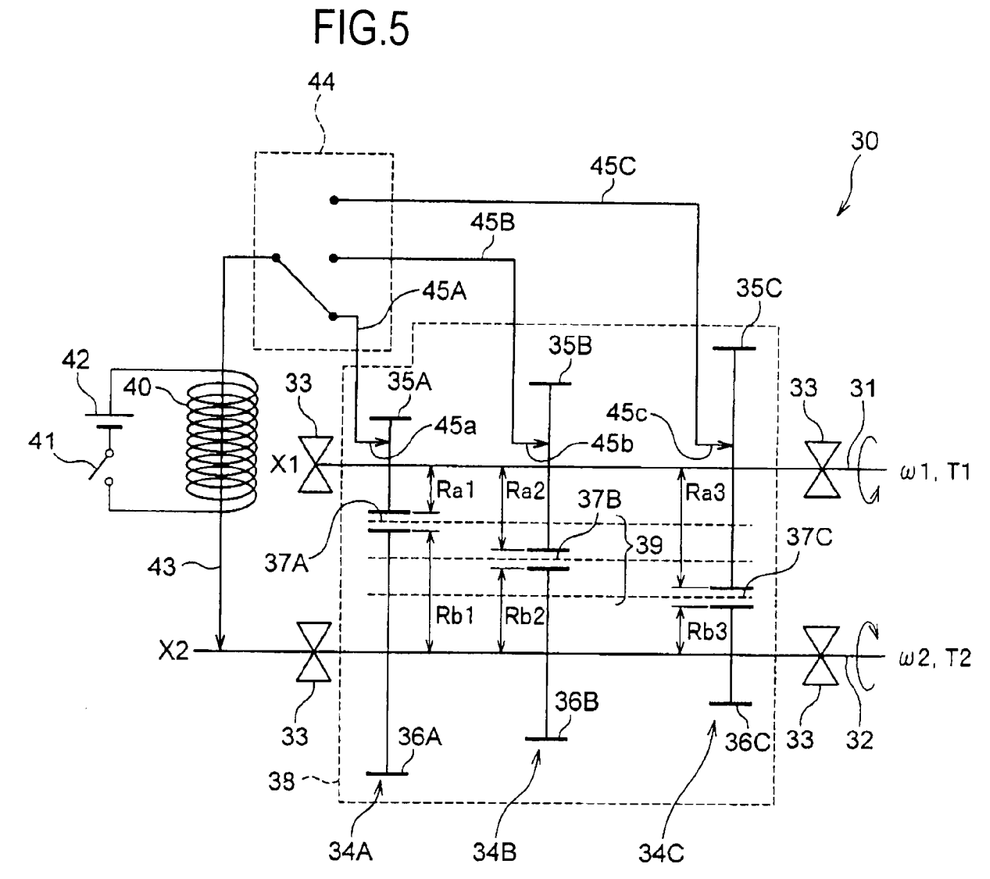
FIG. 5 is a skeleton diagram of a power transmission apparatus according to a second embodiment of the invention.

FIG. 5 shows a power transmission apparatus 30 according to a second embodiment of the invention. The power transmission apparatus 30 is formed to serve as a transmission device for changing a transmission gear ratio between an input shaft 31 and an output shaft 32 in a plurality of (three in an example shown in the drawing) stages. The input shaft 31 and the output shaft 32 are provided as a pair of power transmission shafts and the shafts 31 and 32 are supported by bearings 33 to be rotatable about axes X1 and X2 which are parallel to each other. The input shaft 31 is made of nonmagnetic material and the output shaft 32 is made of magnetic material. Between the input shaft 31 and the output shaft 32, three transmitting portions 34A, 34B, and 34C are provided.

The first transmitting portion 34A is provided with a first drive roller 35A which is rotatable with the input shaft 31 and a first driven roller 36A which is rotatable with the output shaft 32 as rotating bodies. The drive roller 35A and the driven roller 36A are arranged in the same position in an axial direction (a left-right direction in the drawing) and a radial gap 37A is provided between outer peripheral faces of the rollers 35A and 36A. The second transmitting portion 34B is provided with a second drive roller 35B which is rotatable with the input shaft 31 and a second driven roller 36B which is rotatable with the output shaft 32 as rotating bodies. The drive roller 35B and the driven roller 36B are arranged in the same position in the axial direction and a radial gap 37B is provided between outer peripheral faces of the rollers 35B and 36B. The third transmitting portion 34C is provided with a third drive roller 35C which is rotatable with the input shaft 31 and a third driven roller 36C which is rotatable with the output shaft 32 as rotating bodies. The drive roller 35C and the driven roller 36C are arranged in the same position in the axial direction and a radial gap 37C is provided between outer peripheral faces of the rollers 35C and 36C.

The drive rollers 35A, 35B, and 35C are disks made of magnetic material similarly to the drive roller 2 in the first embodiment and the driven rollers 36A, 36B, and 36C are disks made of magnetic material similarly to the driven roller 3 in the first embodiment. However, the drive rollers 35A, 35B, and 35C are different from each other in diameter. The first drive roller 35A has the smallest diameter, the third drive roller 35C has the largest one, and the second drive roller 35B has one intermediate between them. Relationships among radiuses Ra1, Ra2, and Ra3 of rotation in the drawing are Ra1<Ra2<Ra3. The diameters of the driven rollers 36A, 36B, and 36C are differentiated from each other according to diameters of their corresponding drive rollers 35A, 35B, and 35C so that the gaps 37A, 37B, and 37C become substantially equal to each other. Relationships among radiuses Rb1, Rb2, and Rb3 of rotation are Rb1>Rb2>Rb3. The radius Ra1 of rotation of the drive roller 35A is smaller than the radius Rb1 of rotation of the driven roller 36A, the radius Ra2 of rotation of the drive roller 35B and the radius Rb2 of rotation of the driven roller 36B are substantially equal, and radius Ra3 of rotation of the drive roller 35C is greater than the radius Rb3 of rotation of the driven roller 36C. Size of the gaps 37A, 37B and 37C are set similarly to the gap 15 between the rollers 2 and 3 in the first embodiment.

The drive rollers 35A, 35B, and 35C and the driven rollers 36A, 36B, and 36C are enclosed in a common case 38. The case 38 is made of nonmagnetic material. In the case 38, a magnetic fluid 39 is housed to fill the gaps 37A, 37B, and 37C. In place of the common case 38, separate cases may be prepared respectively for the transmitting portions 34A, 34B, and 34C and the magnetic fluid may be housed in them. If the separate cases are provided, characteristics of the magnetic fluid may be different from case to case so that optimum power transmission characteristics can be obtained for each of the transmitting portions 34A, 34B, and 34C.

The power transmission apparatus 30 is further provided with an electromagnetic coil 40 as a magnetism generating device. The electromagnetic coil 40 is connected to a DC power supply 42 via a switch 41. A core 43 made of magnetic material is disposed at a center of the electromagnetic coil 40, one end of the core 43 is connected to the output shaft 32, and the other end of the core 43 is connected to a magnetic path switch 44 as a magnetic path switching device. The magnetic path switch 44 selectively connects the core 43 to any one of magnetic path forming members 45A, 45B, and 45C made of magnetic material. FIG. 5 shows a state in which the magnetic path forming member 45A and the core 43 are connected. The magnetic path forming member 45A extends to the first transmitting portion 34A and a tip end portion 45a of the magnetic path forming member 45A is substantially in contact with the first drive roller 35A. In other words, the magnetic path forming member 45A and the first drive roller 35A are in contact with or close to each other so that a magnetic path is formed between them. For example, the tip end portion 45a of the magnetic path forming member 45A may be formed as a contact such as brush made of magnetic material and may be brought into contact with the first drive roller 35A. Alternatively, the tip end portion 45a of the magnetic path forming member 45A may be put close to a surface of the first drive roller 35A to such a degree that the tip end portion 45a does not come in contact with the roller 35A. The magnetic path forming member 45B is substantially in contact with the second drive roller 35B and the magnetic path forming member 45C is substantially in contact with the third drive roller 35C. A relationship between a tip end portion 45b of the magnetic path forming member 45B and the second drive roller 35B and a relationship between a tip end portion 45c of the magnetic path forming member 45C and the third drive roller 35C may be similar to that between the tip end portion 45a of the magnetic path forming member 45A and the first drive roller 35A.

In the power transmission apparatus 30 formed as described above, by closing the switch 41 to supply excitation current to the electromagnetic coil 40, it is possible to transmit torque input to the input shaft 31 to the output shaft 32 via any one of the transmitting portions 34A, 34B, and 34C. The transmitting portions 34A, 34B, or 34C handling the power transmission can be selected by the magnetic path switch 44.

Figure 6:
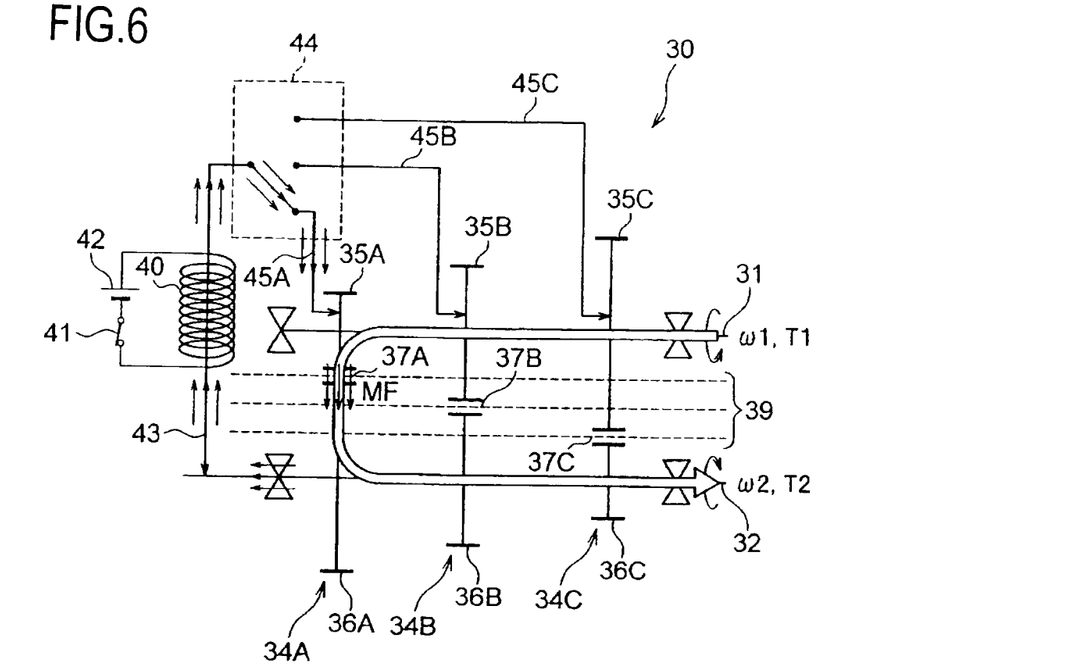
FIG. 6 is a skeleton diagram showing power transmission via a first transmitting portion.

If the magnetic path switch 44 is operated to connect the magnetic path forming member 45A to the core 43, a magnetic path is formed to pass through the core 43, the magnetic path forming member 45A, the first drive roller 35A, the gap 37A, the first driven roller 36A, and the output shaft 32 in order and return to the core 43 as shown with small arrows in FIG. 6. As a result, a magnetic field MF from the first drive roller 35A toward the first driven roller 36A through the gap 37A is generated between the first drive roller 35A and the first driven roller 36A. Therefore, shear stress of the magnetic fluid 39 increases in the gap 37A and power transmission between the input shaft 31 and the output shaft 32 via the first transmitting portion 34A becomes possible. On the other hand, because the magnetic path forming members 45B and 45C are magnetically separated from the core 43, magnetic paths are not formed between the drive roller 35B of the second transmitting portion 34B and the electromagnetic coil 40 and between the drive roller 35C of the third transmitting portion 34C and the electromagnetic coil 40 and power is not transmitted by the transmitting portions 34B and 34C. In other words, the driven rollers 36B and 36C can rotate freely with respect to the drive rollers 35B and 35C and frictional resistances between them are substantially zero.

As a result, in the state in FIG. 6, the torque given to the input shaft 31 is transmitted from the drive roller 35A in the first transmitting portion 34A to the output shaft 32 via the driven roller 36A as shown with a heavy-line arrow in the drawing. At this time, if an angular velocity of the input shaft 31 is $\omega 1$ and an angular velocity of the output shaft 32 is $\omega 2$, a transmission gear ratio $\omega 1/\omega 2$ is equal to a ratio Rb1/Ra1 (see FIG. 5) of the radius Rb1 of rotation of the driven roller 36A to the radius Ra1 of rotation of the drive roller 35A. In the example shown in the drawing, because Rb1 is greater than Ra1, the transmission gear ratio $\omega 1/\omega 2$ is greater than 1 and the output shaft 32 is decelerated as compared with the input shaft 31. Because a ratio T1/T2 between the torque T1 given to the input shaft 31 and the torque T2 of the output shaft 32 is an inverse of the transmission gear ratio $\omega 1/\omega 2$, the torque of the output shaft 32 is greater than the torque of the input shaft 31 in the state in FIG. 6. However, the torque ratio can be adjusted to an appropriate value by changing strength of the magnetic field to increase or decrease a slip ratio between the rollers 35A and 36A.

Figure 7:
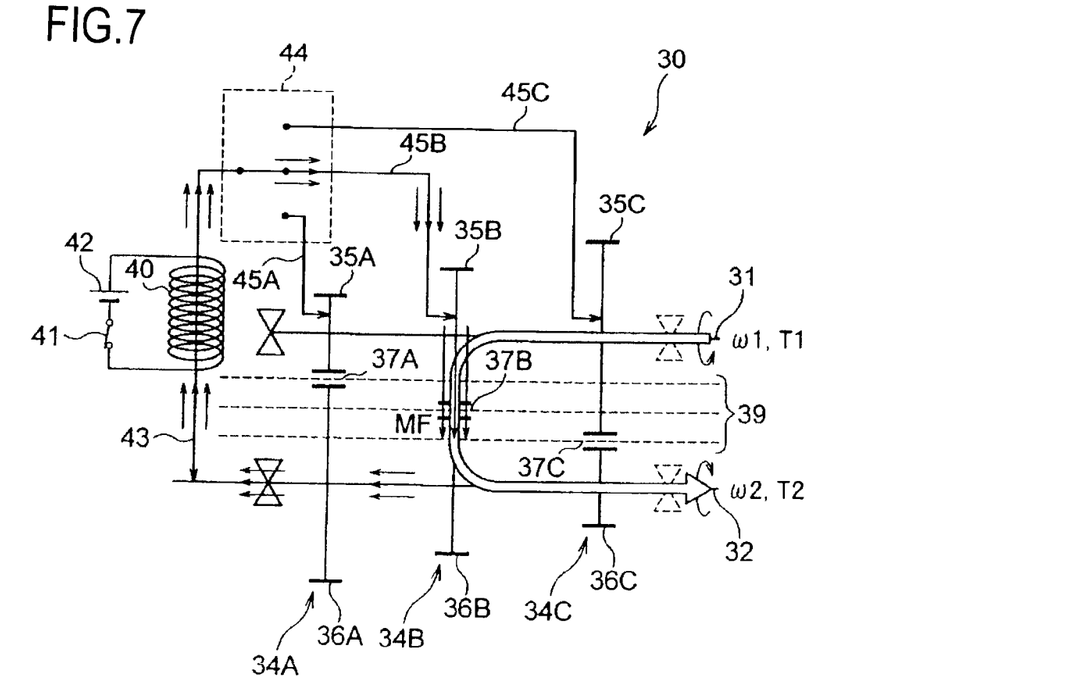
FIG. 7 is a skeleton diagram showing power transmission via a second transmitting portion.

FIG. 7 shows a case in which the magnetic path switch 44 connects the magnetic path forming member 45B to the core 43. At this time, the drive roller 35B and the driven roller 36B in the second transmitting portion 34B are used as members forming a magnetic path and a magnetic field MF from the drive roller 35B toward the driven roller 36B through the gap 37B is generated. In the first transmitting portion 34A and the third transmitting portion 34C, the magnetic field is not generated. Therefore, as shown with a heavy-line arrow in the drawing, torque given to the input shaft 31 is transmitted to the output shaft 32 from the drive roller 35B via the driven roller 36B in the second transmitting portion 34B. At this time, a transmission gear ratio $\omega 1/\omega 2$ between the input shaft 31 and the output shaft 32 is approximately 1, because the radius Ra2 of rotation of the drive roller 35B and the radius Rb2 of rotation of the driven roller 36B are substantially equal. Therefore, the output shaft 32 rotates at a substantially equal speed to the input shaft 31. A torque ratio T1/T2 between the input shaft 31 and the output shaft 32 is approximately 1 as well. However, the torque ratio can be adjusted to a suitable value by changing strength of the magnetic field to increase or decrease a slip ratio between the rollers 35B and 36B.

Figure 8:
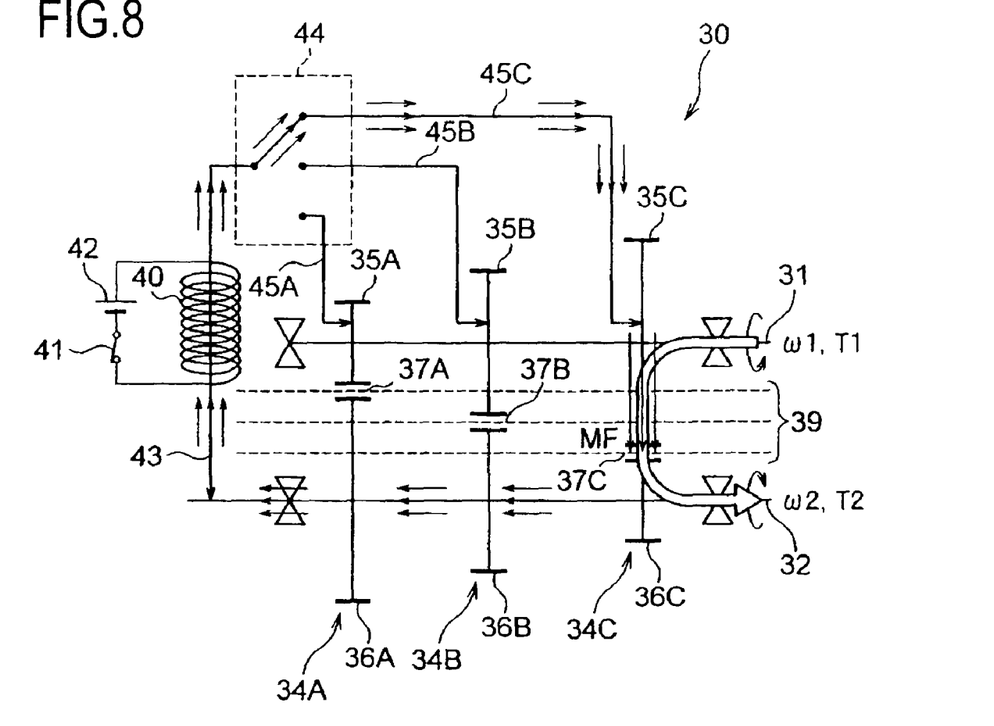
FIG. 8 is a skeleton diagram showing power transmission via a third transmitting portion.

FIG. 8 shows a case in which the magnetic path switch 44 connects the magnetic path forming member 45C to the core 43. At this time, the drive roller 35C and the driven roller 36C in the third transmitting portion 34C are used as magnetic path forming members and a magnetic field MF from the drive roller 35C toward the driven roller 36C through the gap 370 is generated. In the first transmitting portion 34A and the second transmitting portion 34B, the magnetic field is not generated. Therefore, as shown with a heavy-line arrow in the drawing, torque given to the input shaft 31 is transmitted from the drive roller 35C of the third transmitting portion 34C to the output shaft 32 via the driven roller 36C. At this time, a transmission gear ratio $\omega 1/\omega 2$ between the input shaft 31 and the output shaft 32 is smaller than 1, because the radius Ra3 of rotation of the drive roller 35C is greater than the radius Rb3 of rotation of the driven roller 36C. Therefore, the output shaft 32 is accelerated with respect to the input shaft 31. Because a torque ratio T1/T2 between the input shaft 31 and the output shaft 32 is an inverse of the transmission gear ratio $\omega 1/\omega 2$, torque of the output shaft 32 is smaller than torque of the input shaft 31 in the state in FIG. 8. However, the torque ratio can be adjusted to a suitable value by changing strength of the magnetic field to increase or decrease a slip ratio between the rollers 35C and 36C.

If the switch 41 is opened to cancel excitation of the electromagnetic coil 40, the magnetic field does not act on any of the transmitting portions 34A, 34B, and 34C and power transmission from the input shaft 31 to the output shaft 32 becomes impossible. In other words, both of the angular velocity $\omega 2$ and the torque T2 of the output shaft 32 are zero.

As described above, according to the embodiment, it is possible to switch between transmission and non-transmission of power by opening and closing the switch 41. Moreover, at the time of power transmission, it is possible to switch the output torque and the rotation speed of the output shaft 32 among three stages by only switching the magnetic path in the magnetic path switch 44. By changing the strength of the magnetic field in each speed stage, it is possible to change the output torque into more stages or to change it continuously. As a result, it is possible to achieve, with the simple structure, the power transmission apparatus for transmitting power and changing speed.

In the above embodiment, the combination of the output shaft 32, the core 43, the magnetic path switch 44, the magnetic path forming member 45A, 45B, or 45C, the drive roller 35A, 35B, or 35C, and the driven roller 36A, 36B, or 36C serves as the magnetic path forming device. However, the input shaft 31 may be made of magnetic material and connected to the core 43, the output shaft 32 may be made of nonmagnetic material, the magnetic path forming members 45A, 45B, and 45C may be substantially brought into contact with the driven rollers 36A, 36B, and 360, and the magnetic path switch 44 may be provided between the magnetic path forming members 45A, 45B, and 45C and the core 43, instead. The magnetic path forming members 45A, 45B, and 45C may be provided to be substantially in contact with outer peripheral faces of the rollers. The number of speed stages is not limited to three but may be increased or decreased suitably. The power transmission apparatus 30 in the present embodiment exerts similar effects to the first embodiment in each of the transmitting portions 34A, 34B, and 34C.

Third Embodiment

Figure 9:
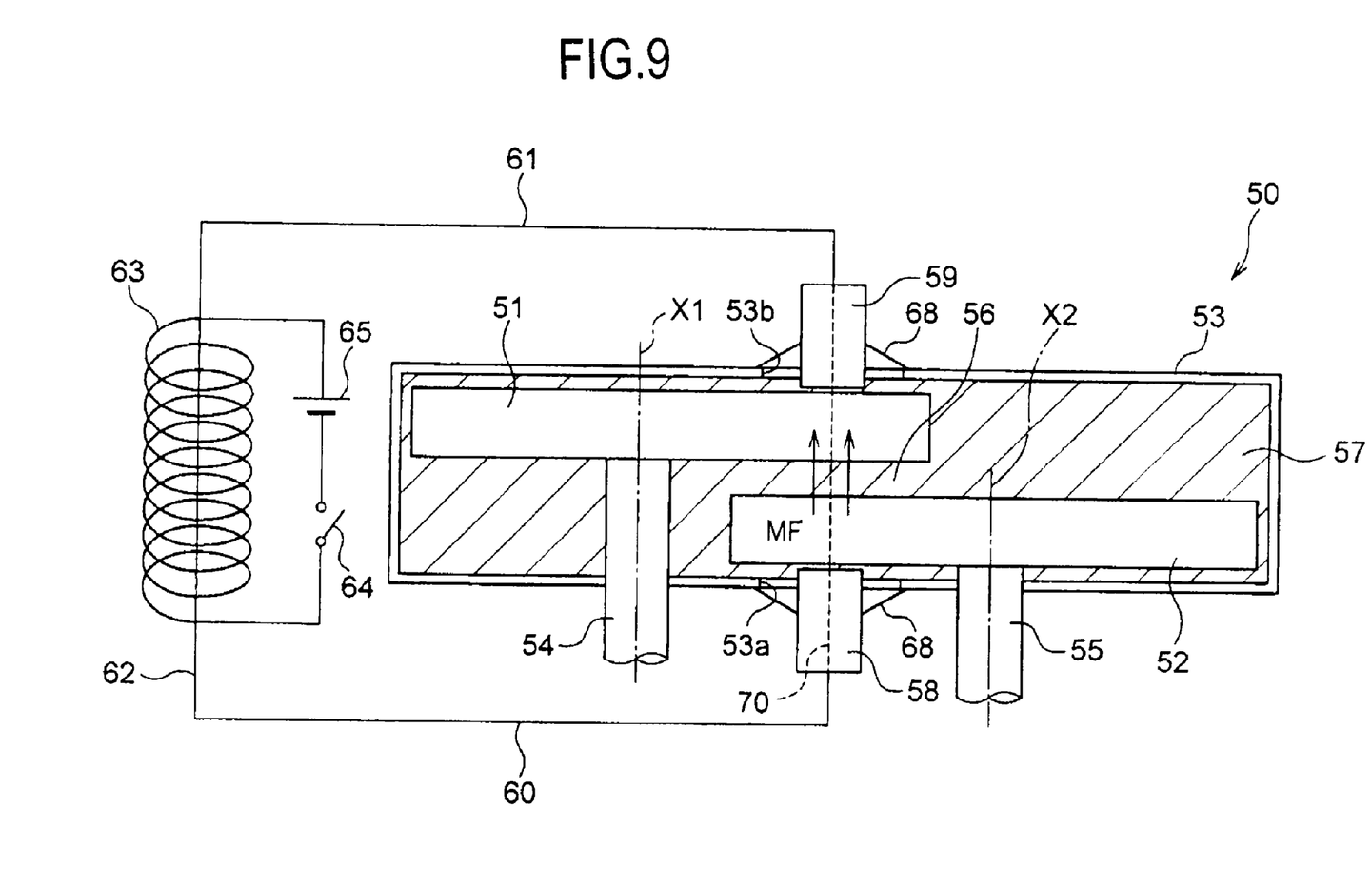
FIG. 9 is a sectional view taken along an axial direction of a power transmission apparatus according to a third embodiment of the invention.
Figure 10:
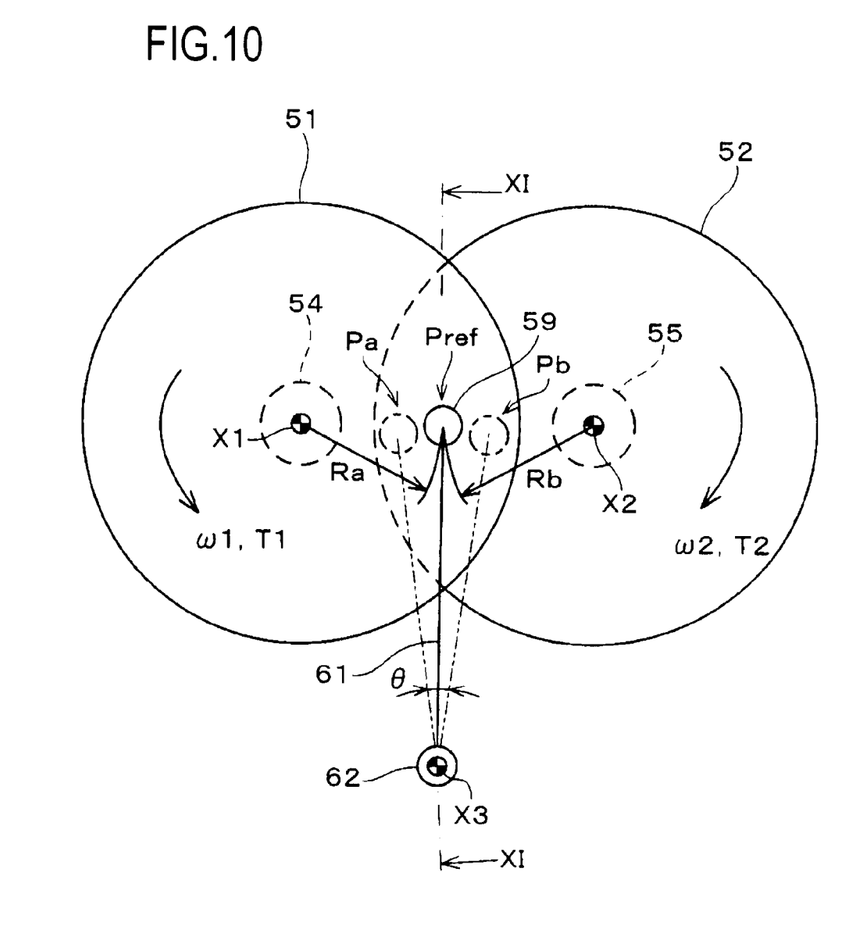
FIG. 10 is a plan view showing a relationship between rollers of the power transmission apparatus according to the third embodiment.
Figure 11:
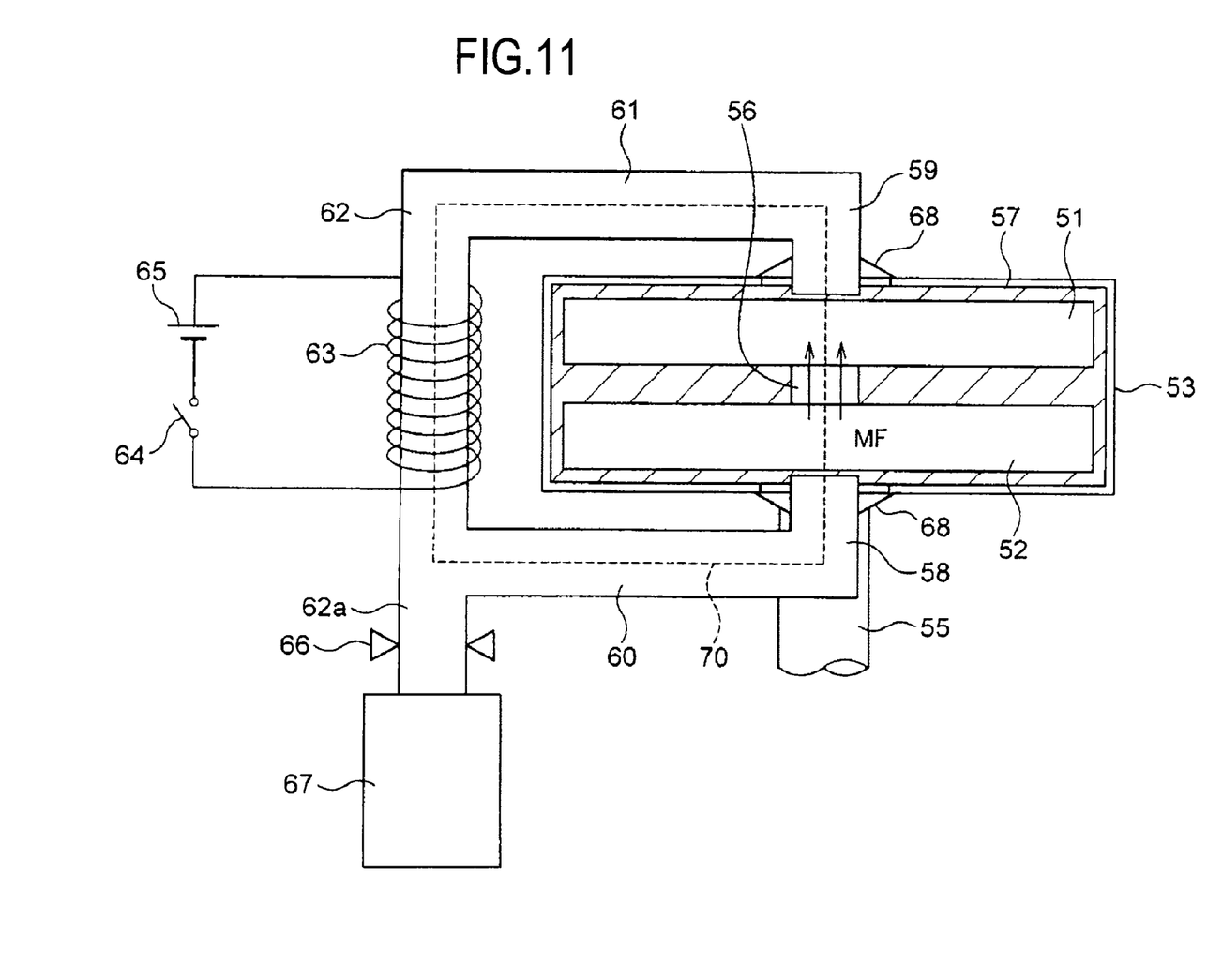
FIG. 11 is a sectional view taken along a line XI-XI in FIG. 10.

FIGS. 9 to 11 show a power transmission apparatus 50 according to a third embodiment of the invention. The power transmission apparatus 50 includes a pair of drive roller 51 and a driven roller 52 as rotating bodies and a case 53 enclosing the rollers 51 and 52. The drive roller 51 is coaxially connected to an input shaft 54 to be rotatable with the input shaft 54. The driven roller 52 is coaxially connected to an output shaft 55 to be rotatable with the output shaft 55. The input shaft 54 and the output shaft 55 are rotatably supported about axes X1 and X2 parallel to each other by bearings (not shown). As is clear from FIGS. 9 and 10, the rollers 51 and 52 are in disk shapes. The rollers 51 and 52 are equal to each other in diameter and thickness in an axial direction (a vertical direction in FIG. 9). Both of the rollers 51 and 52 are made of magnetic material. The rollers 51 and 52 are disposed to face each other in the axial direction with a gap 56 interposed therebetween. In other words, the rollers 51 and 52 are disposed to partially overlap each other when viewed in the axial direction and the axial gap 56 is provided between the overlaps. In the case 53, a magnetic fluid 57 is housed to fill the gap 56. A size of the gap 56 is in such a range that a magnetic path can be formed between the rollers 51 and 52.

A pair of magnetic poles 58 and 59 made of magnetic material is disposed in the axial direction on a lower face side and an upper face side of the case 53 in such a manner as to sandwich the rollers 51 and 52. The magnetic poles 58 and 59 are inserted into the case 53 through openings 53a and 53b in the case 53 and are in contact with the rollers 51 and 52 or close to the rollers 51 and 52, respectively, to such a degree as not to hinder forming of the magnetic path. As shown in FIGS. 9 and 11, the magnetic pole 58 is connected to a core 62 via a lower arm 60 and the magnetic pole 59 is connected to the core 62 via an upper arm 61. All the arms 60 and 61 and the core 62 are made of magnetic material. Around an outer periphery of the core 62, an electromagnetic coil 63 as a magnetism generating device is provided. The electromagnetic coil 63 is connected to a DC power supply 65 via a switch 64. A shaft portion 62a is provided at a lower end of the core 62 and the shaft portion 62a is supported by a bearing 66 to be rotatable about a core axis X3. A lower end portion of the shaft portion 62a is connected to an actuator 67. The actuator 67 is provided as a driving source for rotating the core 62 about the axis X3 in a range $\theta$ shown in FIG. 10. The range $\theta$ is set so that positions of the magnetic poles 58 and 59 can be changed substantially in radial directions of the rollers 51 and 52 between an outermost limit position Pa of the driven roller 52 and an outermost limit position Pb of the drive roller 51. In FIG. 10, only the upper magnetic pole 59 is shown and the lower magnetic pole 58 is hidden by the magnetic pole 59 and invisible.

The case 53 is made of nonmagnetic material. However, the case 53 may be made of magnetic material if there is no possibility that a magnetic path is formed while bypassing the rollers 51 and 52. In order to prevent leakage of the magnetic fluid 57 to an outside of the case 53, seals 68 made of elastic material are provided between the magnetic poles 58 and 59 and the case 53. For the seals 68, seal members such as rubber boots and bellows are used preferably so as not to obstruct the movements of the magnetic poles 58 and 59.

In the power transmission apparatus 50 formed as described above, if the switch 64 is closed to excite the electromagnetic coil 63, as shown in a broken line in FIG. 11, a magnetic path 70 is formed to pass through the core 62, the lower arm 60, the magnetic pole 58, the driven roller 52, the gap 56, the drive roller 51, the magnetic pole 59, and the upper arm 61 in order and then return to the core 62. As a result, as shown with arrows MF in FIGS. 9 and 11, an axial magnetic field from the driven roller 52 toward the drive roller 51 through the gap 56 is generated between the rollers 51 and 52. Because of an influence of the magnetic field, shear stress of the magnetic fluid 57 increases. As a result, power transmission between the drive roller 51 and the driven roller 52 becomes possible. Therefore, as shown in FIG. 10, if torque T1 is given from the input shaft 54 to the drive roller 51, torque T2 is transmitted to the driven roller 52, the driven roller 52 is driven in the same direction as the drive roller 51, and the torque T2 is taken out of the output shaft 55.

In the power transmission apparatus 50 of the embodiment, by rotating the core 62 by the actuator 67, it is possible to move the magnetic poles 58 and 59 substantially in the radial direction to thereby change a position of the magnetic field acting between the rollers 51 and 52. Transmission of torque from the drive roller 51 to the driven roller 52 is carried out in positions of the magnetic poles 58 and 59. Therefore, by changing the position of the magnetic field in the radial direction, it is possible to increase or decrease a ratio between rotation speeds of the drive roller 51 and the driven roller 52. In other words, as shown in FIG. 10, if a distance from the axis X1 of the drive roller 51 to a center (power transmission position) of the magnetic field exerted by the magnetic poles 58 and 59 is Ra, a distance from the axis X2 of the driven roller 52 to the center of the magnetic field is Rb, an angular velocity of the drive roller 51 is $\omega 1$, and an angular velocity of the driven roller 52 is $\omega 2$, a transmission gear ratio $\omega 1/\omega 2$ between the rollers 51 and 52 is determined by Rb/Ra.

Figure 12:
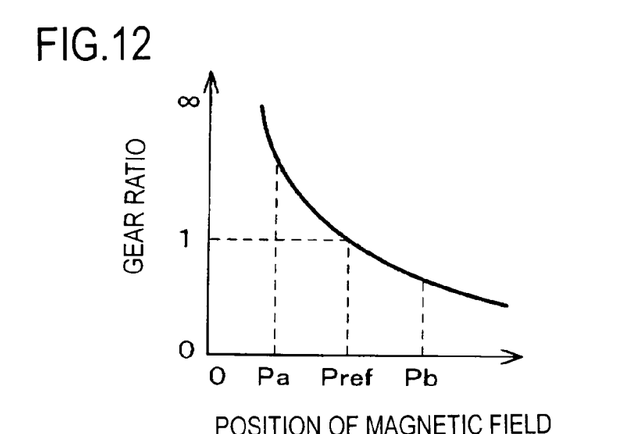
FIG. 12 is a graph showing a relationship between a position of the magnetic field and a transmission gear ratio between the rollers.

Therefore, if the magnetic poles 58 and 59 are disposed in reference positions (positions shown in a solid line in FIG. 10) Pref where the radiuses Ra and Rb are equal to each other, the transmission gear ratio is 1 and the input shaft 54 and the output shaft 55 rotate at equal speed. If the magnetic poles 58 and 59 are moved from the reference positions Pref toward the limit positions Pb on the driven roller 52 side, the transmission gear ratio $\omega 1/\omega 2$ becomes smaller than 1 and the output shaft 55 is accelerated with respect to the input shaft 54. On the other hand, if the magnetic poles 58 and 59 are moved from the reference positions Pref toward the limit positions Pa on the drive roller 51 side, the transmission gear ratio $\omega 1/\omega 2$ becomes greater than 1 and the output shaft 55 is decelerated with respect to the input shaft 54. FIG. 12 shows change of the transmission gear ratio $\omega 1/\omega 2$ along with change of the position where the magnetic field is exerted between Pb and Pa.

If the switch 64 is opened and excitation of the electromagnetic coil 63 is cancelled, the magnetic field between the rollers 51 and 52 disappears and the power transmission from the drive roller 51 to the driven roller 52 becomes impossible. Therefore, even if torque is input to the input shaft 54, the torque is not transmitted to the output shaft 55 and the output shaft 55 does not rotate. At this time, frictional resistance between the rollers 51 and 52 is vanishingly small and substantially zero. Therefore, an energy loss when the power is not transmitted is extremely small.

A torque ratio T1/T2 between the input shaft 54 and the output shaft 55 changes according to an inverse of the transmission gear ratio $\omega 1/\omega 2$. However, the torque ratio can be increased or decreased by changing the strength of the magnetic field to change a slip ratio between the rollers 51 and 52. The strength of the magnetic field can be changed by changing voltage of the power supply 65, by disposing a variable resistance in the electric circuit and operating it, or by applying pulse width modulation control to power-supply voltage or excitation current, for example.

As described above, in the power transmission apparatus 50 in the embodiment, by only radially changing the position of the magnetic field traversing the pair of rollers 51 and 52, it is possible to change the transmission gear ratio and the torque ratio between the rollers 51 and 52. Therefore, it is possible to provide the simple and small power transmission apparatus having both the function of switching between transmission and non-transmission of power and the function of changing the speed.

In the power transmission apparatus 50 in the embodiment, the combination of the rollers 51 and 52, the magnetic poles 58 and 59, the arms 60 and 61, and the core 62 serves as a magnetic path forming device. However, the magnetic path forming device can be changed suitably if the magnetic field axially traversing the gap 56 can be generated between the rollers 51 and 52 while using the rollers 51 and 52 as part of the magnetic path forming device. Because the rollers 51 and 52 are made of magnetic material and used as part of the magnetic path in the embodiment, it is possible to efficiently focus a magnetic flux on the gap 56 to thereby enhance power transmission efficiency. In the power transmission apparatus 50 in the embodiment, the actuator 67 serves as a position changing device. However, a structure of the position changing device can be changed suitably if it changes the magnetic poles 58 and 59 in the radial direction of the rollers 51 and 52. For example, it is possible to provide a mechanism for linearly moving the arm 60, the arm 61, or the core 62 in a direction connecting the axes X1 and X2.

Figure 13:
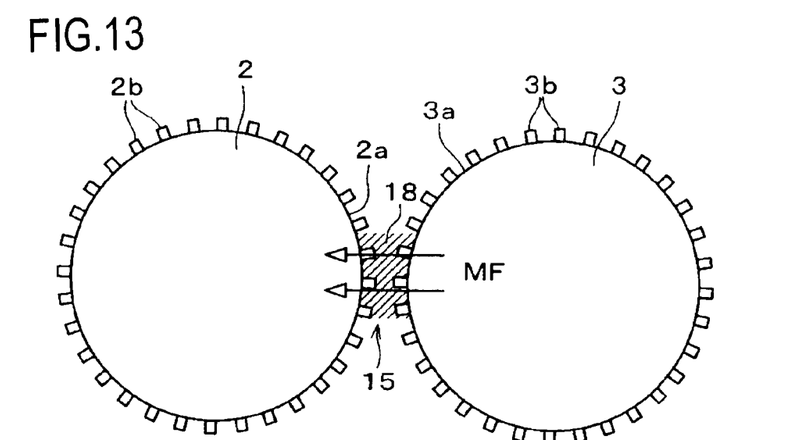
FIG. 13 is a drawing showing an example in which outer peripheral faces of a pair of rotating bodies are provided with unevenness.
Figure 14:
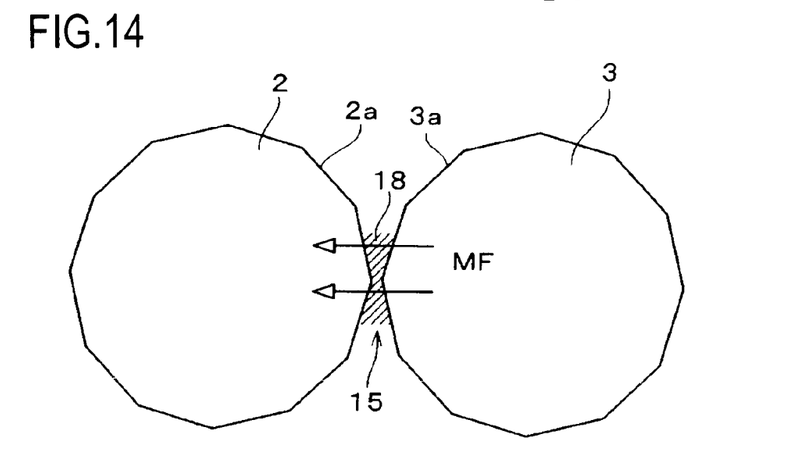
FIG. 14 is a drawing showing another example in which outer peripheral faces of a pair of rotating bodies are provided with unevenness.

The invention is not limited to the first to third embodiments described above but can be carried out in suitable modes. For example, shapes of the rotating bodies are not limited to disk shapes but may be changed to suitable shapes. FIG. 13 shows an example in which a large number of protrusions 2b or 3b are provided at regular intervals in a circumferential direction on the outer peripheral face 2a or 3a of the drive roller 2 and the driven roller 3. FIG. 14 shows an example in which outer peripheries of the drive roller 2 and the driven roller 3 are formed in shapes of regular polygons. As shown in these examples, if the outer peripheral faces of the drive roller 2 and the driven roller 3, i.e., the surfaces facing the gap 15 are provided with unevenness along the circumferential direction, slippage between the magnetic fluid 18 and the rollers 2 and 3 decreases and the power transmission efficiency is enhanced when the magnetic field is exerted on the gap 15 and shear stress of the magnetic fluid 18 is increased. The drive rollers 35A, 35B, and 35C and the driven rollers 36A, 36B, and 36C in the second embodiment may be similarly provided with unevenness.

Figure 15:
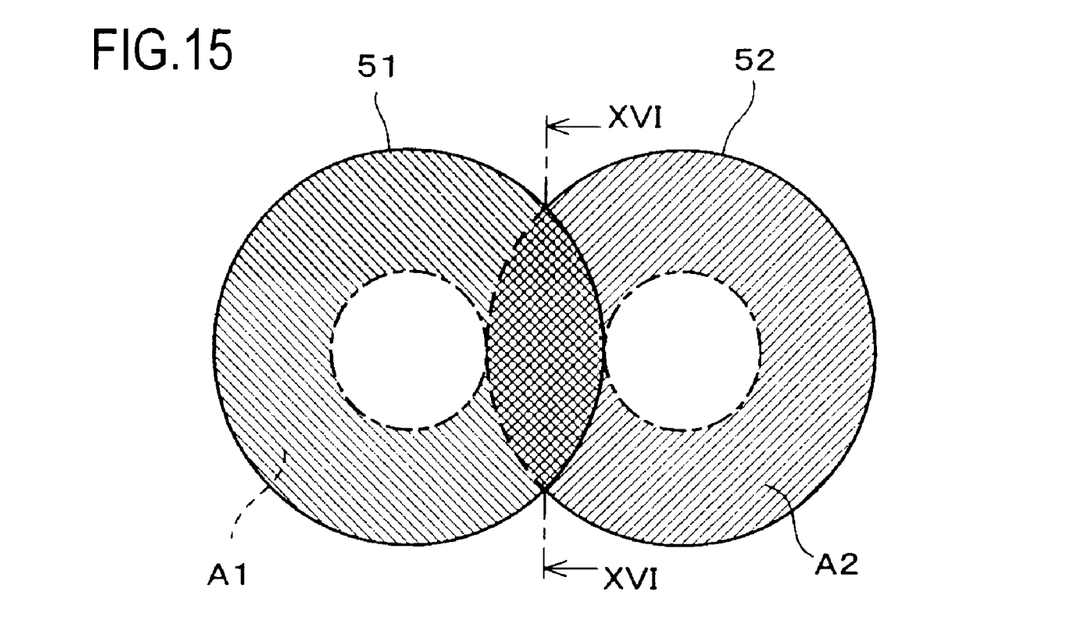
FIG. 15 is a drawing showing an example in which faces of a pair of rotating bodies facing each other in the axial direction are provided with unevenness.
Figure 16:
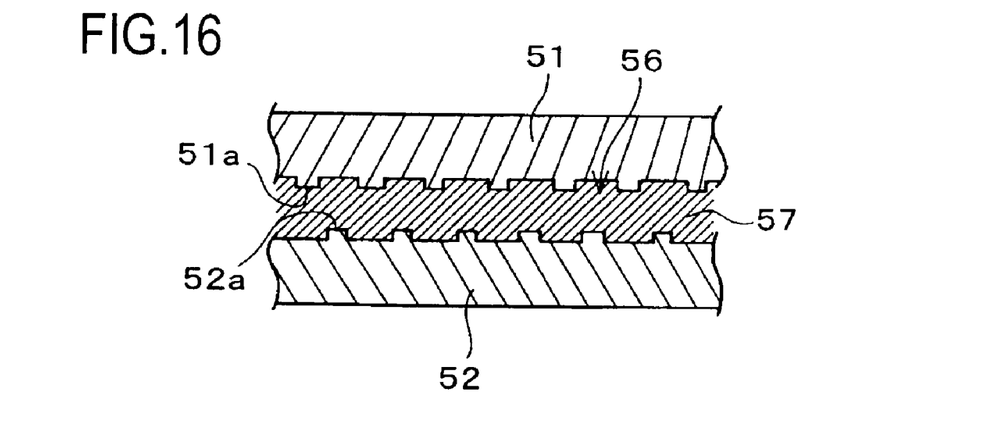
FIG. 16 is a sectional view taken along a line XVI-XVI in FIG. 15.

FIGS. 15 and 16 show an example in which a large number of protrusions 51a and 52a are provided at regular intervals in a circumferential direction in areas A1 and A2, i.e., on surfaces facing the gap 56, where the drive roller 51 and the driven roller 52 in the third embodiment overlap each other in the axial direction. In this case, similarly to the above examples, slippage between the rollers 51 and 52 and the magnetic fluid 57 decreases and power transmission efficiency is enhanced. In any of the examples in FIGS. 13 to 16, the unevenness to be provided to the rotating bodies is not limited to the shapes shown in the drawings but may be changed suitably if it is in such shapes as to be engaged with the magnetic fluid in the circumferential directions. The unevenness may be provided to only one of the rotating bodies.

In the invention, the magnetism generating device is not limited to the electromagnetic coil but may be a permanent magnet or a yoke. The direction of the magnetic field is not limited to those in the examples shown in the drawings and the magnetic field may be exerted from the drive roller side toward the driven roller side. The power transmission apparatus in the invention can be mounted not only in the power transmission system of the vehicle but also in suitable power transmission systems. For example, the invention may be applied between a sun roller and a planetary roller or between the planetary roller and a ring roller in a planetary roller mechanism to switch between transmission and non-transmission of power and change a transmission gear ratio and a torque ratio between the rollers, for example.

In the invention, the rotating bodies are not necessarily disposed to be rotatable about the parallel axes. The axes may not be parallel if they are not coaxial with each other. For example, conical rotating bodies may be disposed with a gap interposed between their conical faces and a magnetic field may act in a direction from one of the rotating bodies toward the other via the gap.

As described above, according to the power transmission apparatus of the invention, the pair of rotating bodies made of magnetic material is disposed to be rotatable about the two parallel axes, respectively, the rotating bodies are used as part of the magnetic path, and the magnetic field acts from one of the rotating body toward the other rotating body via the gap to transmit power between the rotating bodies. Therefore, the power transmission apparatus does not only have a function of switching between transmission and non-transmission of power but also has a function as a transmission device of power while changing the rotation speed and the torque ratio. As a result, it is possible to increase a degree of freedom in setting regarding power transmission.

The invention claimed is:

1. A power transmission apparatus comprising:
a pair of rotating bodies made of magnetic material, rotatable about different axes, and provided with a gap therebetween;
a case enclosing the pair of rotating bodies;
a pair of power transmission shafts connected coaxially with the pair of rotating bodies through the case, respectively;
a magnetic fluid housed in the case to fill the gap;
a magnetism generating device for generating magnetism; and
a magnetic path forming device for forming a magnetic path of the magnetism generated by the magnetism generating device so that a magnetic field from one of the rotating bodies toward the other of the rotating bodies via the gap is generated, wherein
a plurality of transmitting portions are provided between the pair of power transmission shafts,
the pair of rotating bodies is disposed in each of the plurality of transmitting portions,
a ratio of radiuses of rotation of the pair of rotating bodies is different between the transmitting portions, and
the magnetic path forming device has a magnetic path switching device for selecting any one transmitting portion from the plurality of transmitting portions to form the magnetic path between the pair of rotating bodies in the transmitting portion and the magnetism generating device and for disconnecting the rotating bodies in the other transmitting portions which were not selected and the magnetism generating device from each other so that the magnetic path is not formed.

2. The power transmission apparatus according to claim 1, wherein the axes of the pair of rotating bodies are parallel to each other and the gap is provided between outer peripheral faces of the pair of rotating bodies.

3. The power transmission apparatus according to claim 1, wherein the axes of the pair of rotating bodies are parallel to each other and the pair of rotating bodies is provided with the gap therebetween to face each other in an axial direction.

4. The power transmission apparatus according to claim 3, wherein the magnetic path forming device is provided with a pair of magnetic poles arranged in the axial direction to sandwich the pair of rotating bodies, and the power transmission apparatus further includes a position changing device for changing positions of the pair of magnetic poles in radial directions of the rotating bodies.

5. The power transmission apparatus according to claim 1, further comprising a magnetic field adjusting device for changing strength of the magnetic field.

6. The power transmission apparatus according to claim 1, wherein a surface of at least one of the rotating bodies facing the gap is provided with unevenness along a circumferential direction thereof.

* * * * *